Figure 1:
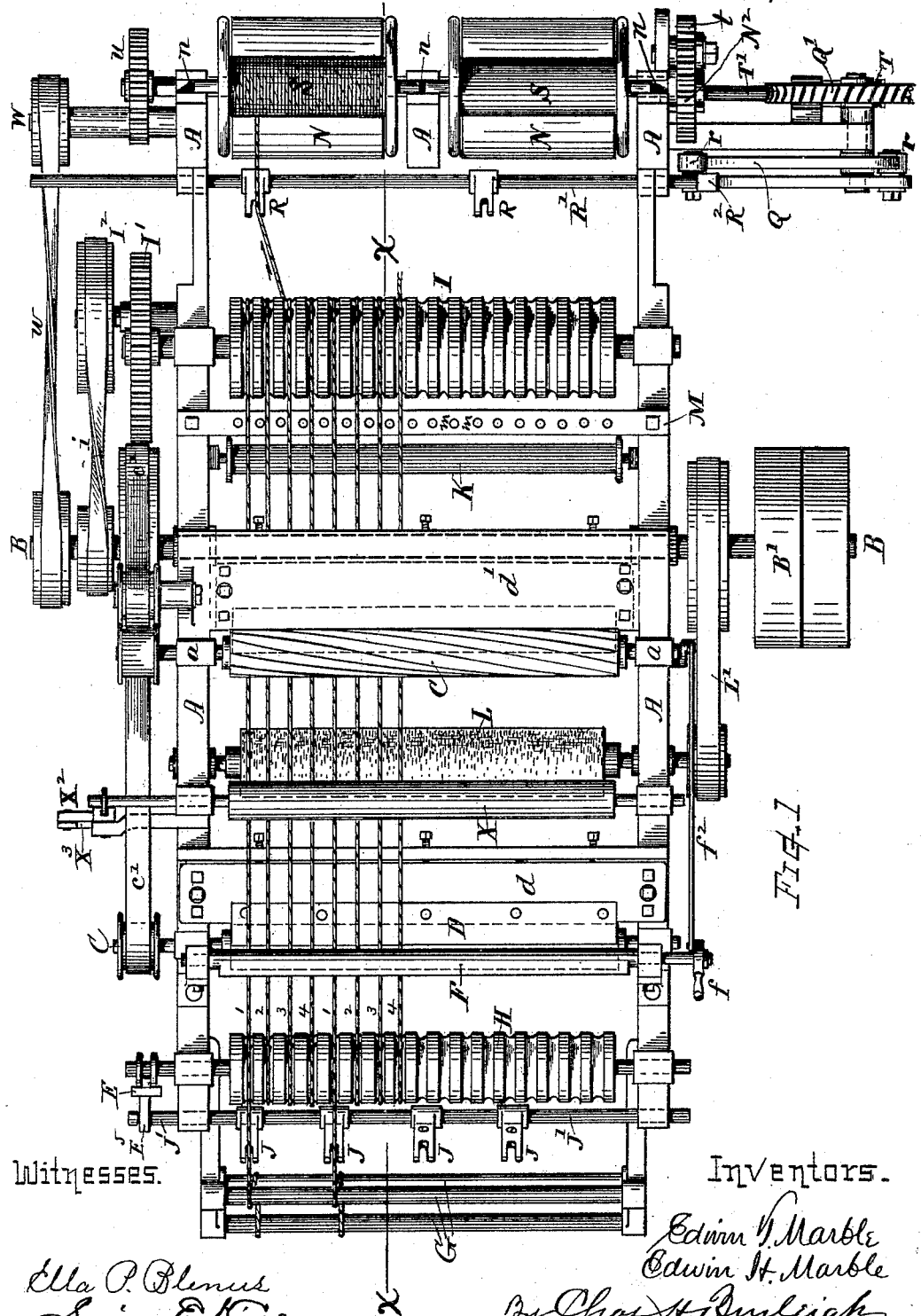

(No Model.) 4 Sheets—Sheet 1.
E. T. & E. H. MARBLE.
MECHANISM FOR SHEARING CORDS OR TWINE.

No. 492,408. Patented Feb. 28, 1893.

Witnesses.
Ella P. Blenus
Simeon E. King

Inventors.
Edwin T. Marble
Edwin H. Marble
By Chas. H. Burleigh
Attorney.

(No Model.) 4 Sheets—Sheet 2.

E. T. & E. H. MARBLE.
MECHANISM FOR SHEARING CORDS OR TWINE.

No. 492,408. Patented Feb. 28, 1893.

Witnesses.
Ella P. Blenus.
Simeon E. King.

Inventors.
Edwin T. Marble
Edwin H. Marble
By Chas H. Burleigh
Attorney (No Model.) 4 Sheets—Sheet 3.
E. T. & E. H. MARBLE.
MECHANISM FOR SHEARING CORDS OR TWINE.
No. 492,408. Patented Feb. 28, 1893.
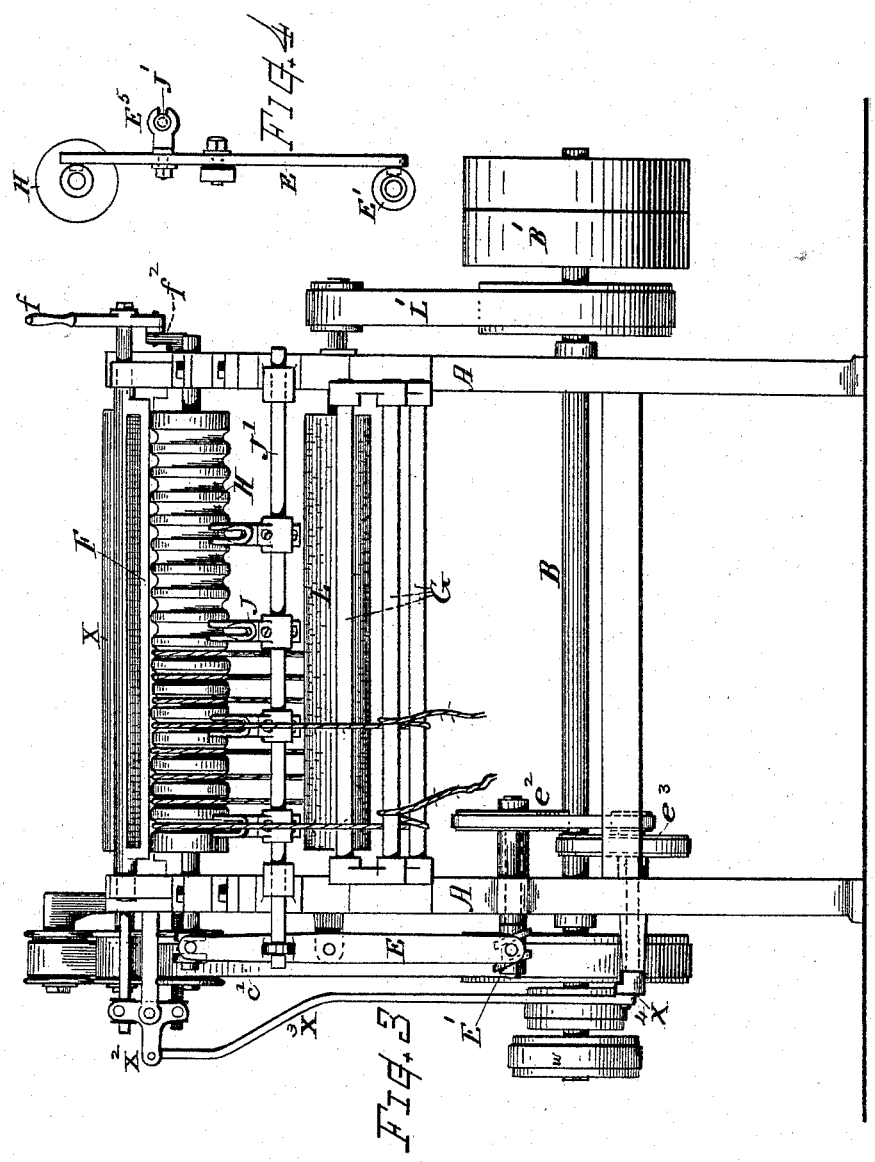

(No Model.) 4 Sheets—Sheet 4.
E. T. & E. H. MARBLE.
MECHANISM FOR SHEARING CORDS OR TWINE.
No. 492,408. Patented Feb. 28, 1893.
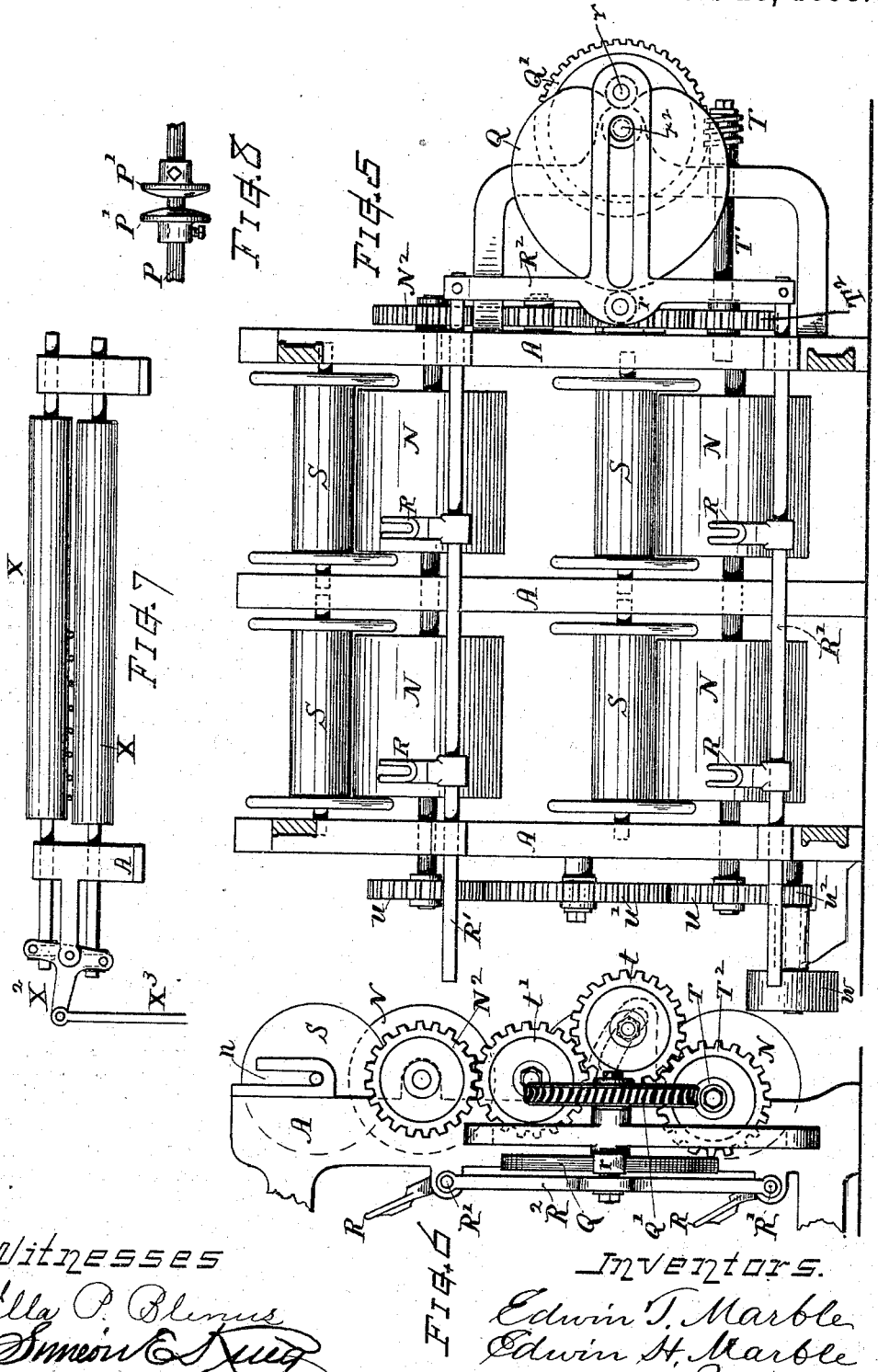
Witnesses
Ella P. Blinus
Simeon E. Kurtz
Inventors.
Edwin T. Marble
Edwin H. Marble
By Chas. H. Burleigh
Attorney

UNITED STATES PATENT OFFICE.

EDWIN T. MARBLE AND EDWIN H. MARBLE, OF WORCESTER, MASSACHUSETTS.

MECHANISM FOR SHEARING CORDS OR TWINE.

SPECIFICATION forming part of Letters Patent No. 492,408, dated February 28, 1893.

Application filed June 2, 1892. Serial No. 435,257. (No model.)

*To all whom it may concern:*

Be it known that we, EDWIN T. MARBLE and EDWIN H. MARBLE, citizens of the United States, residing at Worcester, in the county of Worcester and State of Massachusetts, have invented new and useful Mechanism for Shearing Cords or Twine, of which the following, together with the accompanying drawings, is a specification sufficiently full, clear, and exact to enable persons skilled in the art to which this invention appertains to make and use the same.

In the manufacture of cordage or twine from sisal-hemp or similar fibrous materials, the product when delivered from the twisting operations has on its surface numerous projecting fliers or ends of fibers that have escaped being twisted into the body of the cord; and these projecting fibers require to be removed or sheared off in order to give a smooth and desirable finish on the exterior of the twine or cordage. Shearing of this class of product has heretofore, with some degree of success, been practiced; but by methods and mechanisms of different nature, organization and operation from the method and mechanism of our invention herein presented.

The objects of our present invention are, to afford a method and means whereby cord or twine can be successfully shorn of projecting fibers in a practically complete, expeditious and more efficient manner than it has been heretofore done; also, to provide a shearing mechanism comprising a rotating cutter cylinder, a ledger-blade, and guide-rests, combined with circumferentially grooved carriers or delivering roll and draft-roll, whereby the cord or twine is straightened, advanced longitudinally and fed to the shearing mechanism in proper manner for the removal of the projecting fibers.

Another object is to provide means for laterally vibrating, turning or partially rolling the strands of twine as they are advanced to the shearing cutters.

Another object is to provide a twine-shearing mechanism having facilities for the return and re-passage of the twine to the shearing cutters one or more times and by a continuous operation.

Another object is to provide means for the shearing of the cord or twine and the coiling, winding or balling of the same ready for market by continuous operation and as fast as it is delivered from the shearing devices.

Figure 2:
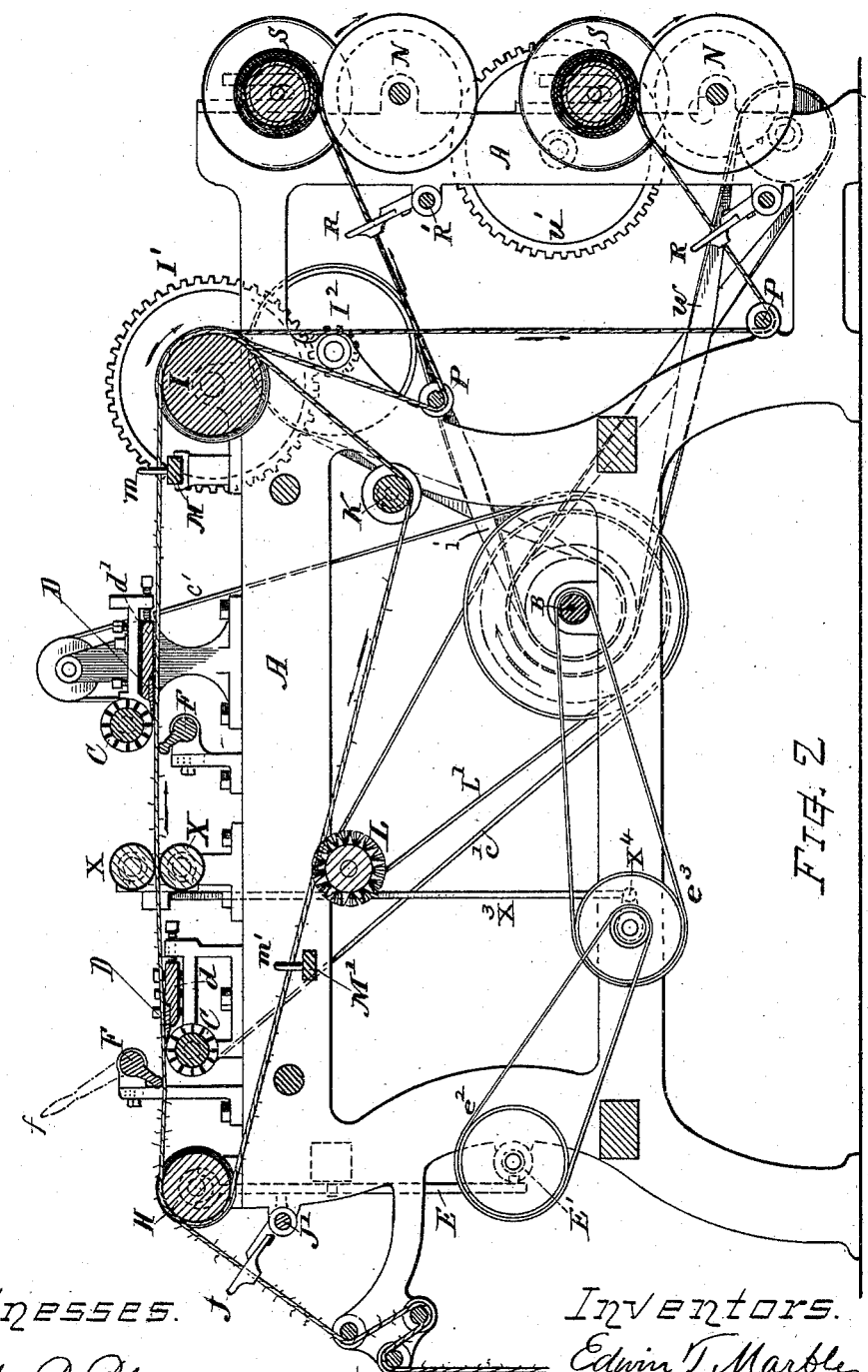

These objects we attain by the method and means explained in the following description and illustrated in the drawings, wherein Figure 1 is a plan view of mechanism embodying our invention. Fig. 2 is a longitudinal vertical section at line *x x*. of Fig. 1. Fig. 3 is a front end elevation. Fig. 4 is a side view of means for vibrating the delivering roll and guide-finger bar. Fig. 5 is a vertical section showing the front of the balling or spooling devices. Fig. 6 is an end view of the same. Fig. 7 is a separate front view of rub-rolls and means for vibrating the same, and Fig. 8 shows the form of guide collars on the back bars.

The particular subject matter claimed is hereinafter definitely specified.

According to our improved method the cord or twine is properly supported or strained between suitable rolls or guides and advanced longitudinally over a transversely disposed shearing mechanism, or a series of shearing mechanisms, and at the same time a rolling or twisting action is imparted to the cord or twine for subjecting its cylindrical surface more completely to the influence of the shearing cutters; further by re-passing the cord or twine in several successive and continuous returns to the shear, or series of shearing devices, bringing all sides of the twine into juxtaposition with shearing cutters and thus insuring ample presentation without delay in time of action for the thorough and complete clipping of the entire surface.

Our mechanism is preferably constructed and organized for operation as follows:

Referring to parts, A denotes the main frame of suitable form for supporting the several operating devices in their peculiar organized relations.

B indicates the drive-shaft provided with suitable pulleys B' for receiving, and other necessary pulleys for transmitting the power and motion to the several parts of the machine.

C C indicate shear-cylinders or revolvers similar to those employed in cloth-shearing machines, mounted to rotate in bearings $a$ on the side frames, and provided with a series of spiral blades that act in conjunction with transversely disposed stationary ledger-blades D D that are fixed to suitable beds $d\,d'$. The revolvers C are operated by belt $c'$ from a pulley on the drive-shaft.

F F indicate the adjustable rests or presser-bars for guiding the cords or twine adjacent to the shearing cutters. Said rests are best pivotally supported at their ends on the bearings so as to swing up and down for affording access to the cutters and for permitting knots to pass over the shears. A handle-lever $f$ is attached to the projecting axle of one bar, and a connecting rod $f^2$ therefrom, and crank connection with the axle of the other bar facilitates the simultaneous retraction of the rest-bars when desired by a swinging movement of the handle $f$.

I indicates a circumferentially grooved draft-roll in the rear of the shearing mechanism for feeding or advancing the twine longitudinally through or over the shears, and H indicates a circumferentially grooved roller or carrier at the front of the machine from which the twine is delivered to the shearing devices and thence to the draft roller I. The tops of the grooved rolls H and I are best disposed very nearly in line with the shearing cutters, or so that the twine, when the rests F are released will extend direct from one roll to the other and lie adjacent to but not touching the ledger-blades D; and then when the rests are turned on the twine will be pressed closely across the ledger-blade. Roll I is operated by a gear I', pinion and pulley $I^2$ and belt $i$ from a pulley on the drive-shaft B. [See Figs. 1 and 2.]

G indicates a series of bars arranged across the front of the frame for straightening and giving a limited tension on the twine as it enters the machine.

J indicates a guide or series of guide-fingers for separating the cords or twine and directing the separate cords to the proper grooves in the roll H. The roll H and guide-supporting rod J' and guides J have an endwise vibratory action, or reciprocatory movement imparted to them by means of the lever E and revolving cam E' or by other suitable means. The cam E' and its shaft are rotated by pulleys and belts $e^2\,e^3$ from the drive-shaft B. [See Figs. 2 and 3.]

The lever E has adjustably fixed thereon an arm $E^5$ that works the bar J' simultaneously with the endwise movement of the delivery roll H. The degree of movement imparted to the guides J is best proportioned relatively to that of the roll H in such manner that the twine will be kept straight from the bars G to the roll H; thus in the present instance the extent of lateral movement of the guide-fingers J is about one-half the extent of the endwise movement of the roll H.

The endwise reciprocation or vibration of the grooved roller H, while the twine is fed over it and advanced to the shearing devices, causes a lateral rolling action or turning of the twine to the right and left as it approaches the shearing cutters; so that all parts of the cylindrical surface of the twine is presented to the shears, the cutters of which act in a plane or right line, and the projecting fibers are thus completely and closely clipped off. This vibratory action also distributes the work along a definite portion of the blades instead of wearing the blades wholly at one point.

X X indicate endwise vibrating rub rolls disposed between the shearing appliances, and employed for vibrating, rolling or turning the cords or twines laterally in front of the second set of shearing appliances. Said rolls are mounted to turn freely in their bearings, the upper roll resting upon the twine. Endwise reciprocating movement is imparted to said rolls, or one of them, by means of a vibrator or lever $X^2$ fulcrumed on a suitable arm of the frame and connected by a rod $X^3$ with a crank $X^4$ on the shaft of the intermediate pulley $e^3$, or in other convenient manner. In some instances these rub-rolls X are omitted, the lateral vibration of the delivering roll H being depended upon for turning the twine for all the sets of shearers.

K indicates a return-guide roll arranged below the draft-roller I and parallel therewith; and L indicates a revolving brush disposed between said guide-roller K and the forward grooved roll H. Said brush is rotated by suitable pulleys and a belt L' in connection with the drive shaft B.

M indicates a transversely disposed stationary bar having upright pin guides $m$ disposed in front of the draft-roll I, and M' is a similar bar with pins $m'$ near the front of the machine beneath the shears. Said pin-guides serve for keeping the several strands of twine separate from each other and causing them to travel in their own respective grooves as they pass onto the rolls H and I.

P P indicate guide-bars having thereon adjustable collars P' [see Fig. 8] between which the respective finished strands pass on their way from the draft-roll to the spooler or ball-forming mechanisms.

The width of the machine can be made of such dimension as to carry and shear any desired number of strands of twine simultaneously; and to re-pass each twine any desired number of times in contact with the shearing cutters. The present illustration shows accommodation for four strands of twine [two of which are shown on the drawings] each passing four times through the shearing mechanism, as at 1, 2, 3, 4, [see Fig. 1] which is equivalent to eight single shearing operations.

In practice the machines are preferably made to carry a greater number of strands, say twenty strands, more or less, each re-passing four or five times, more or less, before its final delivery for winding up or balling. Two sets of shearing devices are herein shown, one disposed for action beneath the twine and one above the twine; we do not, however, desire to confine this invention to any particular number of shearing devices, as one, two or more of such devices can be employed arranged transversely to the direction of the feed of the twine, and to operate in the manner substantially as herein set forth.

In practice, when desired, well known means such as usually employed on revolvers of cloth-shearing machinery can be combined with the revolvers C C for imparting endwise vibratory movement thereto; this, however, not being an essential part of our present invention is not shown in the drawings.

In connection with the shearing and shear-feeding mechanism, we preferably provide means for coiling, winding or balling the twine ready for market as fast as it is delivered from the shears and continuous with the shearing operation.

The mechanism for winding the twine consists of a series of rotatable drums N corresponding in number to the number of cords or twines carried by the grooved rolls H and I. Said drums are mounted on shafts that turn in bearings on the frames A that are also fitted with slots $n$ for retaining the axles of the winding spools S in conjunction with and in a manner to roll upon the drum surfaces. Guide-fingers R fixed to laterally reciprocating rods R' are arranged in front of the drums N for directing the respective cords or twines as they are led from the guides P to the drums and winders S. The guide-rods R' are connected with a head $R^2$ carrying studs or rolls $r$ that work in conjunction with the heart-shaped cam Q, whereby reciprocative action is imparted to the rods R' and series of guide-fingers R. The fingers R are best made of the same form as the guide-fingers J. A worm-wheel Q' is fixed on the axis of cam Q and operated by a worm-screw T fixed on a shaft T' having at its other end a gear $T^2$ that in turn is operated by a gear $N^3$ and intermediate gear $t$ mounted on a stud that is adjustable on the frame, power being transmitted from the drum shaft and driving mechanism. The gear $t'$ that meshes with the intermediate gear $t$ is made interchangeable with gears of other diameter, and adjustment of speed of the reciprocating guides R to accommodate the winding of twine of different size, quality, or twist can, when desired, be effected by changing the size of the said gear and moving the stud of the intermediate gear to bring the gear in mesh. The drums N are rotated by the gears $u\,u'\,u^2$ from the shaft W which is operated by a pulley and belt $w$ from the operating shaft B [see Fig. 1] or in other suitable manner.

In the operation, each separate twine travels in similar order on its respective allotted portion of the machine, while all advance simultaneously. The twine is first led through the series of tension bars G, [see Fig. 2] then through the guides J and over the grooved roller H, from which it is delivered to the shearing mechanism, passing over the first shears C between the rub rolls X and under the following shear C, then passing between the pins $m$ on the guide-bar M to and around the grooved draft-roller I; it is then carried under the return-guide roll K, over the brush L and back to a second groove on the grooved delivering roll H, returned to the top of said roll, and re-passed from thence again over the shear and to a second groove of the draft-roll I. In like manner again returned back to a third groove in the delivering roll H and so on, going over the shears three, four, or five times, more or less, as desired. Finally the strand is carried from the draft-roll I beneath the guide-bar P and thence to the guide R and winder-drum N of the spooling or balling mechanism where it is coiled or wound up continuously with and as fast as it comes from the shearers on the spool S. The spool is subsequently removed from the coil, leaving the twine balled ready for market. Each time the twine passes the shearing cutters any projecting fibers that come into line with the blades are clipped off, and as the twine passes the brush L loose but close lying fibers are thereby raised so that they will be sheared off by the subsequent passage over the cutters.

The speed of the draft-roll I is made sufficient to advance the twine rapidly over the shears and the number of passes insures the complete shearing at all sides of the strands so that a very rapid and perfect operation is effected.

The pressers or rests F can be turned back for allowing the knots, by which the ends of the pieces of twine are connected, to pass the cutters. If desired some of the returns of the twine beneath the roll can be carried direct from the roll I to roll H without going under the guide-roll K and thus by changing the length of the re-pass loop preventing the knot coming around to the shear at each re-pass in the same relative position as regards the other strands, so that the raising of any rest will not cause an unshorn place to appear in the finished product.

We claim as our invention herein to be secured by Letters Patent—

1. A machine for shearing cord or twine, comprising, in combination substantially as described, an endwise reciprocating delivering roll and a draft-roll arranged for presenting a series of cords or twines by longitudinal advancement directly from one of said rolls to the other, a transversely disposed ledger-blade and shearing revolver located intermediate to said rolls, guides that direct the return of the individual cords or twines from the draft-roll to the front of the delivery-roll, a brush acting on the twine surface during its return travel, and guides that separately direct the strands for re-passing, at adjacent positions, again to the same shearing devices for additional shearing action continuously and simultaneously effected by one or more successive re-passes, as set forth.

2. A mechanism for shearing and balling twine, comprising shearing devices consisting of a transversely disposed ledger-blade and shearing-revolver, the delivering-roll, draft-roll, and guide-roll adapted for passing and repassing the twine by longitudinal advancement through a series of shearing operations, vibrating appliances that roll or move the twine laterally right and left to present different parts of its surface to the shears, a spooler or balling mechanism arranged for winding the strands of twine into finished balls for the market, and guides that conduct the twine from the shear to said balling mechanism by continuous operation immediately and as fast as it is finished and delivered by the shears, substantially as set forth.

3. The combination, with shearing mechanism consisting of a transversely disposed ledger-blade, shearing-revolver and guiding rest, of the endwise movable delivering-roll at the front of said shear, and the draft-roll at the rear of said shear each circumferentially grooved or adapted for carrying in separated order a series of cords or twine and advancing the same through said shears, directing guides for the individual cords at the front of said draft-rolls, and means for imparting endwise motion to said delivering-roll substantially as set forth.

4. The combination, substantially as described, of the tension-bars, the guide-fingers, the circumferentially grooved delivering-roll and a circumferentially grooved draft-roll adapted for straightening and longitudinally advancing a series of cords or twine, and a plurality of shearing mechanisms each comprising a ledger-blade and a shearing-revolver, and adjustable rest bar oppositely disposed adjacent to the plane of the twine between said rolls and successively operating upon the twine as it passes from one roll to the other, and means substantially as described for vibrating or imparting endwise reciprocative movement to said delivering roll, for the purpose set forth.

5. The combination, of the tension-bars, the guide-fingers, the grooved delivering roll, the shearing cutters and rest, the grooved draft-roll, the pin-guide in front of said draft-roll, the return guide-roll and the pin-guide-bar beneath the shearing cutters near the front of the machine, all substantially as and for the purposes set forth.

6. The combination, of the grooved delivering roll and draft-roll, a plurality of sets of shearing appliances, each comprising a revolver and ledger-blade, located adjacent to but slightly away from the direct line or plane between said rolls, and disposed respectively above and below the same, a pivotally supported presser-bar arranged in front of each set of cutters and adapted by its swinging action to deflect or relieve the twine to or from the shearing contact, and the handle-lever and connections for operating said presser-bars as described, for the purpose set forth.

7. In a twine-shearing machine, the combination, substantially as described, of the grooved delivering roll, the grooved draft-roll, the shearing cutters intermediate of said rolls, the return guide roll disposed below said draft-roll, the revoluble brush disposed between said guide-roll and delivering roll, the guides J and P and pin-guides $m\ m'$, for the purpose set forth.

8. The combination, with the shearing appliances, circumferentially grooved delivering-roll from which the twine passes to the shearing blades, and the tension bars by which the twine is led to said roll; of guiding fingers between said tension bars and roll, the support bar for said guide fingers and vibrator cam and lever, and means substantially as described connected with the roll axle and support bar for simultaneously imparting to said delivering-roll and guide-finger-support endwise movement of proportional extent to accord to the relative positions of said guide-fingers and delivering-roll from said tension-bars, as set forth.

9. In a twine-shearing machine, the combination with a ledger-blade, a shearing revolver and a twine-guiding rest, of a set of revoluble endwise movable rub-rolls disposed adjacent to said twine-guiding rest, for rolling the twine laterally as it is advanced to the said shearing revolver, substantially as described, and an operating connection that imparts endwise reciprocating action to said rolls, for the purpose set forth.

10. The combination, substantially as described, of the endwise vibrating delivery-roll, the draft-roll, and a plurality of sets of shearing appliances each composed of a ledger-blade, a shearing-revolver and a guiding rest, disposed between said delivery-roll and draft-roll, a pair of revoluble endwise movable rub-rolls disposed between said sets of shearing appliances, and the operating connections for imparting opposite endwise movement to said rolls, for the purpose set forth.

Witness our hands this 28th day of May, A. D. 1892.

EDWIN T. MARBLE.
EDWIN H. MARBLE.

Witnesses:
E. F. BISCO,
JOHN H. COES.